(12) United States Patent
Saxena

(10) Patent No.: US 7,161,950 B2
(45) Date of Patent: Jan. 9, 2007

(54) SYSTEMATIC MEMORY LOCATION SELECTION IN ETHERNET SWITCHES

(75) Inventor: Rahul Saxena, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 945 days.

(21) Appl. No.: 10/014,007

(22) Filed: Dec. 10, 2001

(65) Prior Publication Data

US 2003/0110305 A1 Jun. 12, 2003

(51) Int. Cl.
*H04L 12/56* (2006.01)
(52) U.S. Cl. ............... 370/414; 370/395.7; 370/412
(58) Field of Classification Search ............ 370/395.7, 370/395.71, 395.72, 412–414, 428, 429
See application file for complete search history.

(56) References Cited

U.S. PATENT DOCUMENTS

| | | | | |
|---|---|---|---|---|
| 5,410,540 | A * | 4/1995 | Aiki et al. ................. | 370/390 |
| 5,602,988 | A * | 2/1997 | Haulin ..................... | 714/42 |
| 5,915,097 | A | 6/1999 | Chao | |
| 6,128,654 | A * | 10/2000 | Runaldue et al. ........... | 709/219 |
| 6,167,054 | A * | 12/2000 | Simmons et al. ........... | 370/422 |
| 6,192,028 | B1 * | 2/2001 | Simmons et al. ........... | 370/229 |
| 6,504,846 | B1 * | 1/2003 | Yu et al. .................... | 370/412 |
| 6,574,231 | B1 * | 6/2003 | Leung ....................... | 370/412 |
| 6,577,636 | B1 * | 6/2003 | Sang et al. ............... | 370/395.7 |
| 6,606,317 | B1 * | 8/2003 | Beadle et al. .............. | 370/390 |
| 6,618,390 | B1 * | 9/2003 | Erimli et al. .............. | 370/412 |
| 6,760,341 | B1 * | 7/2004 | Erimli et al. .............. | 370/412 |
| 6,904,039 | B1 * | 6/2005 | Hung et al. ................ | 370/390 |
| 2001/0010692 | A1 * | 8/2001 | Sindhu et al. ............. | 370/395 |

* cited by examiner

*Primary Examiner*—Kenneth R. Coulter
(74) *Attorney, Agent, or Firm*—Fish & Richardson P.C.

(57) ABSTRACT

A switch and a process of operating a switch are described where a received data frame is stored into memory in a systematic way. In other words, a location is selected in the memory to store the received data frame using a non-random method. By storing the received data frame in this way, switches that employ this system and method increase bandwidth by avoiding delays incurred in randomly guessing at vacant spaces in the memory. The received data frame is stored until a port that is to transmit the received data frame is available. Throughput is further improved by allowing the received data frames to be stored in either contiguous or non-contiguous memory locations.

22 Claims, 11 Drawing Sheets

SYSTEMATIC MEMORY LOCATION SELECTION IN ETHERNET SWITCHES

TECHNICAL FIELD

This invention relates to forwarding data frames, and more particularly to an Ethernet switch that efficiently uses systematic memory location selection.

BACKGROUND

Some switches, such as Ethernet switches, receive data frames at one or more ports. A data frame is an organized format of control or header data and payload data. The header data typically include fields such as the source address of the device transmitting the data frame, the destination address or addresses to which the data frame is being transmitted, length/type data indicating the length of the data frame as well as the data type of the payload data, and a frame check sequence field used as a form of error checking in verifying receipt of the data frame by the destination device. The control data are overhead that are used to ensure that the payload data arrive at the destination device. Control data may be modified by the switch before forwarding to the destination device.

The payload data are the data of interest that are sent to the destination device. Examples of payload data include pixel data for image rendering, audio data, text data and control data (e.g., commands requesting that the destination device transmit information back to the original source device).

In some network implementations, data frames may have different sizes. For example, in a typical Ethernet network, frame size may vary from a minimum of 64 bytes to a maximum of 1,518 bytes.

A switch receives and sequentially forwards data frames to an output port for retransmission to another switch or the destination device. In some switches, a memory is employed to temporarily store a received data frame until the needed port becomes free to output that data frame. These types of switches may be referred to as store-and-forward (SAF) switches.

One design criterion for SAF switches is the width of the memory. Increasing the width of the memory increases the memory access raw bandwidth (i.e., accessing more bytes of data stored in the wider memory for every clock cycle). Memory usage can be inefficient, as only a portion of the memory bandwidth is not used when storing smaller data frames (i.e., a small data frame stored in a wide memory leaves a portion of the memory vacant). Thus, the statistical speed, or efficiency of useful bandwidth, decreases as the memory width increases due to the smaller data frames being stored leaving some part of the memory bus width vacant.

To compensate for this, a memory, such as one that is 256 bytes wide, is divided into independently addressable channels. This allows for smaller data frames to be stored in particular channels, which results in more efficient use of memory and increased throughput. As an example, several smaller data frames can be stored together in memory to reduce the amount of vacant space.

A channel is defined as a portion of the total bus width of a memory. A segment is a logical address in the memory that consists of storage elements from each of the n channels in the memory (e.g., a segment may include four channels). A location is a part of memory that is addressable by both a channel address and a segment address.

One operation performed by a switch is the selection of a channel and segment address to store a received data frame. Typically, this is done randomly, which may result in a problem during the selection of a write address in the memory. More particularly, when write addresses are selected randomly, it is possible that the write address selected will map to a memory location presently occupied by another data frame. This requires the write address selector to randomly select another address and check that address to determine if it contains valid data. Thus, if the memory is substantially full when a new data frame is received, the switch may generate several write addresses that map to full memory locations before generating an address that maps to an empty memory location. This slows down the switch's performance and decreases its bandwidth.

In addition, reading data frames randomly stored in memory also decreases the useful bandwidth of the memory. As an example, suppose a memory has four channels and the switch receives a data frame that is two channels wide. If the switch receives a second data frame that is also two channels wide, it may randomly place the second data frame in another segment, leaving the segment with the first data frame with two vacant channels. Thus, as each segment is clocked to output its data, only half of the available bandwidth will be used to output data in each of the two clock cycles.

Some switches face the further constraint of needing to store data frames contiguously so that data frames are not written across multiple segments. This may cause gaps in the memory that cannot be filled. As large data frames are received, they are written into multiple channels of a single segment. If some of the channels in a particular segment are not used, they will remain unused unless a small data frame is received that can be stored into those empty channels of the segment.

DESCRIPTION OF DRAWINGS

FIG. 4b is a block diagram of a cell of the memory circuit of FIG. 4a.

Like reference symbols in the various drawings indicate like elements.

DETAILED DESCRIPTION

Figure 1:
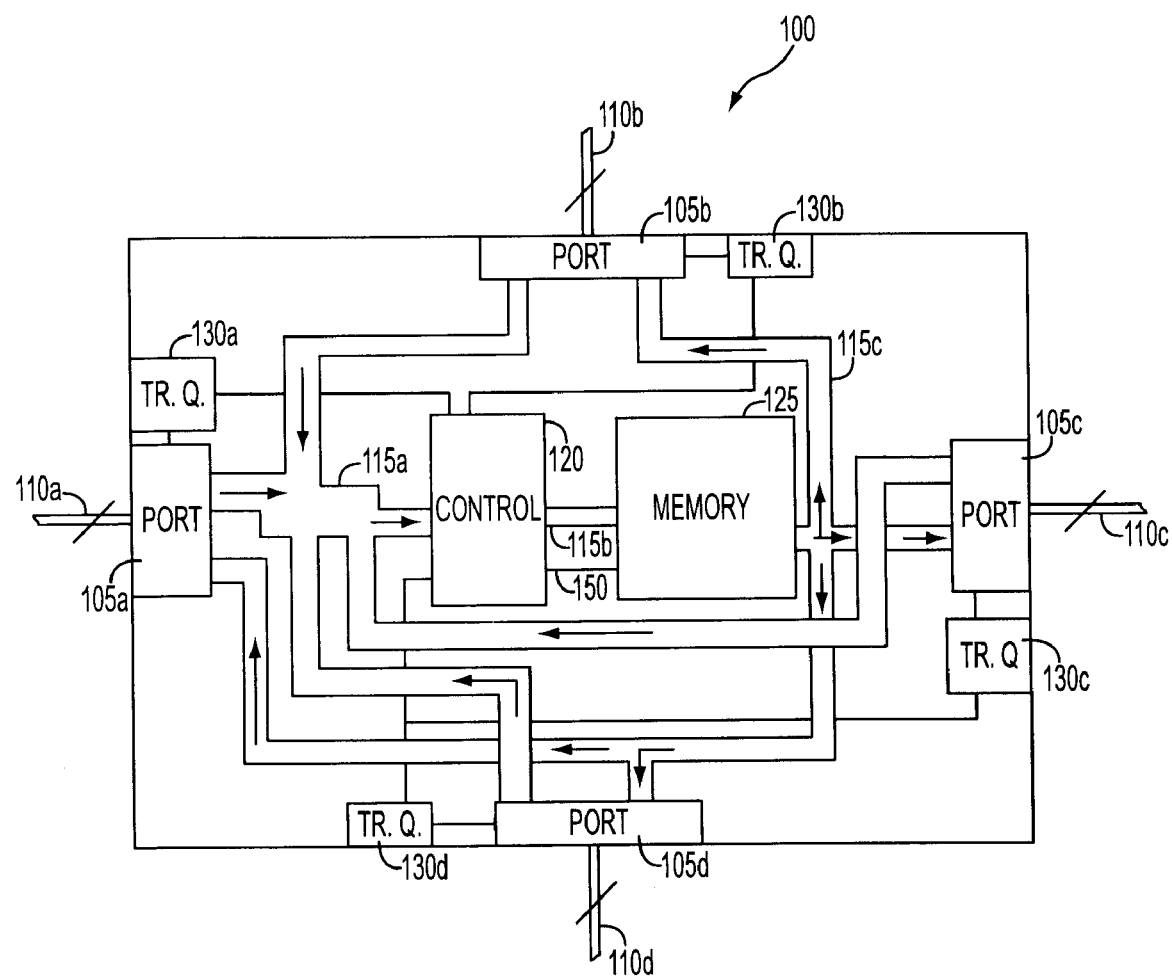
FIG. 1 is a block diagram of a switch.

As shown in FIG. 1, a switch 100 has four ports 105a–105d. Ports 105a–105d are circuits that may include hardware, software, firmware or any combination thereof.

The ports 105a–105d are coupled to four buses 110a–110d, respectively, and are used to transmit data from and receive data into switch 100. Ports 105a–105d and buses 110a–110d are full duplex in that they can transmit and receive data frames simultaneously. In one implementation, switch 100 is an Ethernet switch.

A receiving bus 115a and a transmitting bus 115c are coupled to ports 105a–105d. Receiving bus 115a forwards received data frames from ports 105a–105d to a control circuit 120. An intermediate bus 115b forwards received data frames from control circuit 120 to main memory 125. A bus 150 forwards address data to main memory 125 for use in storing the received data frames. The transmitting bus 115c forwards data frames stored in main memory 125 to ports 105a–105d. Four transmission queues 130a–130d that are associated with ports 105a–105d, respectively, are interspersed in switch 100. Control circuit 120 is coupled to the four transmission queues 130a–130d and main memory 125 through control signal paths. It should be noted that control circuit 120 and transmission queues 130a–130d may be implemented as logic circuits that may include gates, hardware, software, firmware or any combination thereof to perform the functions described.

In general, the switch 100 receives data frames on buses 110a–110d at ports 105a–105d. The received data frames then are forwarded to control circuit 120 using receiving bus 115a. Control circuit 120 non-randomly determines particular locations in main memory 125 for storing the received data frame. Control circuit 120 forwards the received data frame to main memory 125 for storage. Transmission queues 130a–130d determine when to output the stored data frame over buses 110a–110d using ports 105a–105d based upon control data received from control circuit 120.

Figure 2:
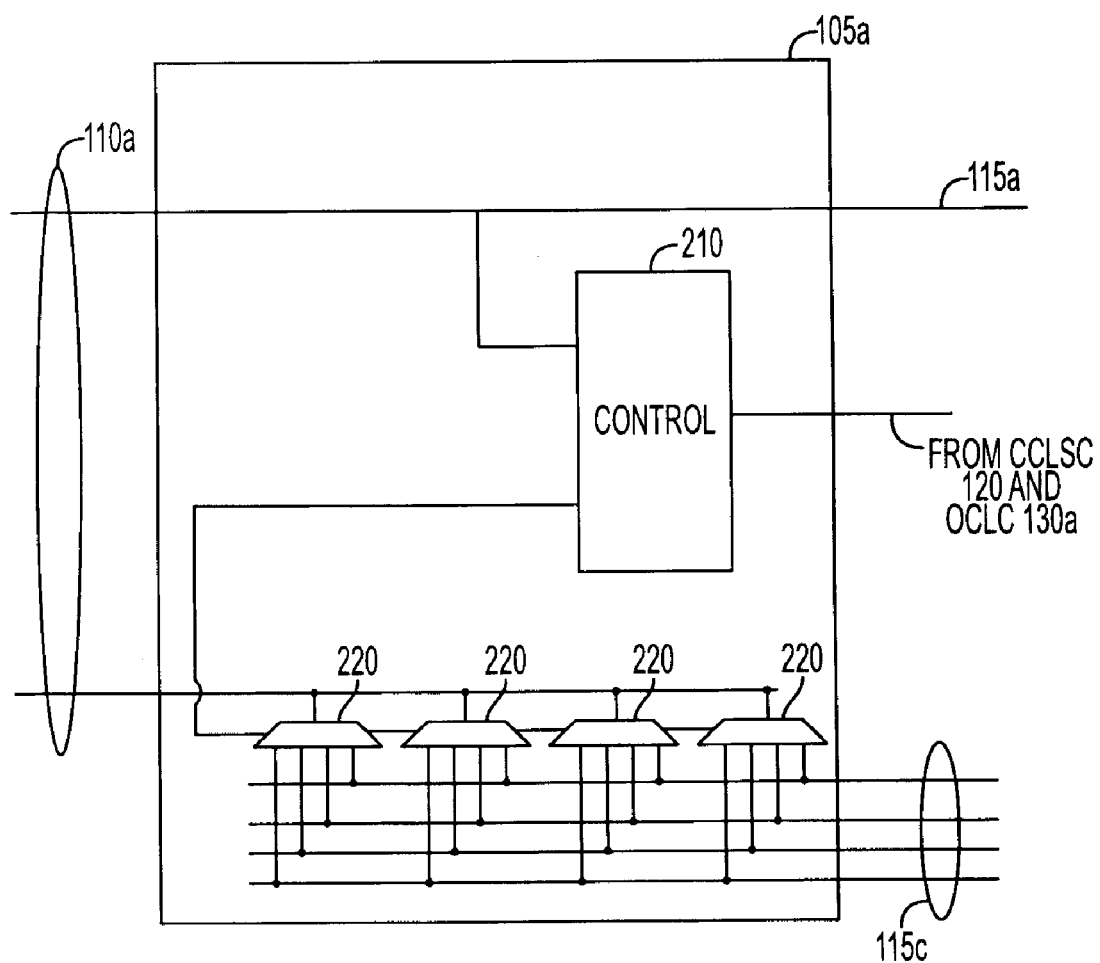
FIG. 2 is block diagram of a port of the switch of FIG. 1.

As shown in FIG. 2, exemplary port 105a contains control circuit 210 and multiplexers 220. Exemplary port 105a receives a data frame on transmitting bus 115c for forwarding. The data frame received on transmitting bus 115c is extracted from transmitting bus 115c by multiplexers 220. Control circuit 215 exchanges control signals with CCSLC 120 and OCLCs 130a–130d.

Figure 3:
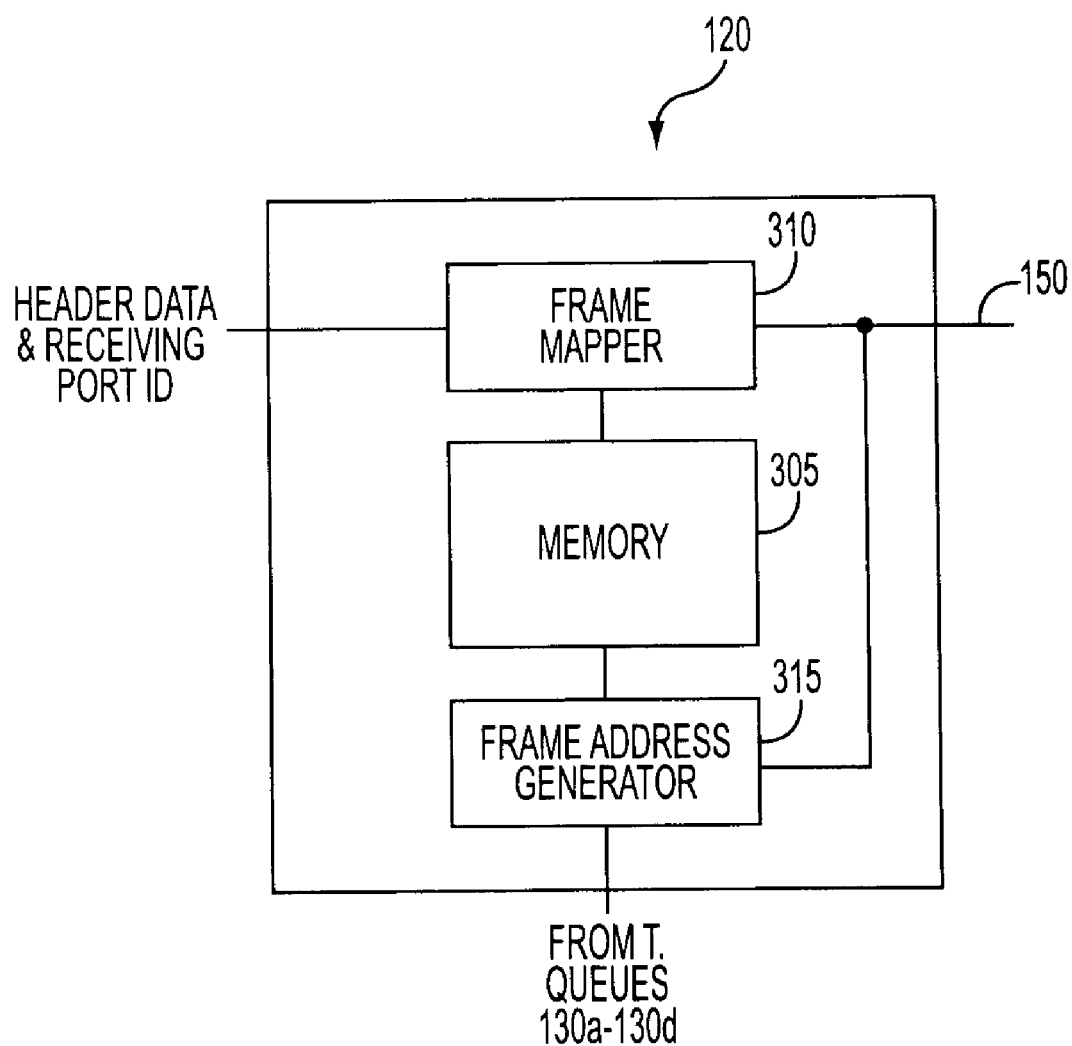
FIG. 3 is a block diagram of the controller of the switch shown in FIG. 1.

As shown in FIG. 3, control circuit 120 includes a memory 305. Memory 305 is smaller than main memory 125 and tracks the occupied and available locations in main memory 125. Control circuit 120 also includes a frame mapper circuit 310 and a frame address generator circuit 315. Frame mapper circuit 310 is a logic circuit that receives data from memory 305 and determines an empty or vacant (i.e., not currently storing valid data) location in main memory 125 that will store the recently received data frame. In addition, frame address generator 315 also generates data or map codes that indicate the location in main memory 125 that will store the recently received data frame. Frame address generator circuit 315 is also a logic circuit but it generates addresses based upon the data or map code it receives from the transmission queues 130a–130d. The generated addresses are used to read out the desired data frame from its particular location in main memory 125.

Figure 4A:
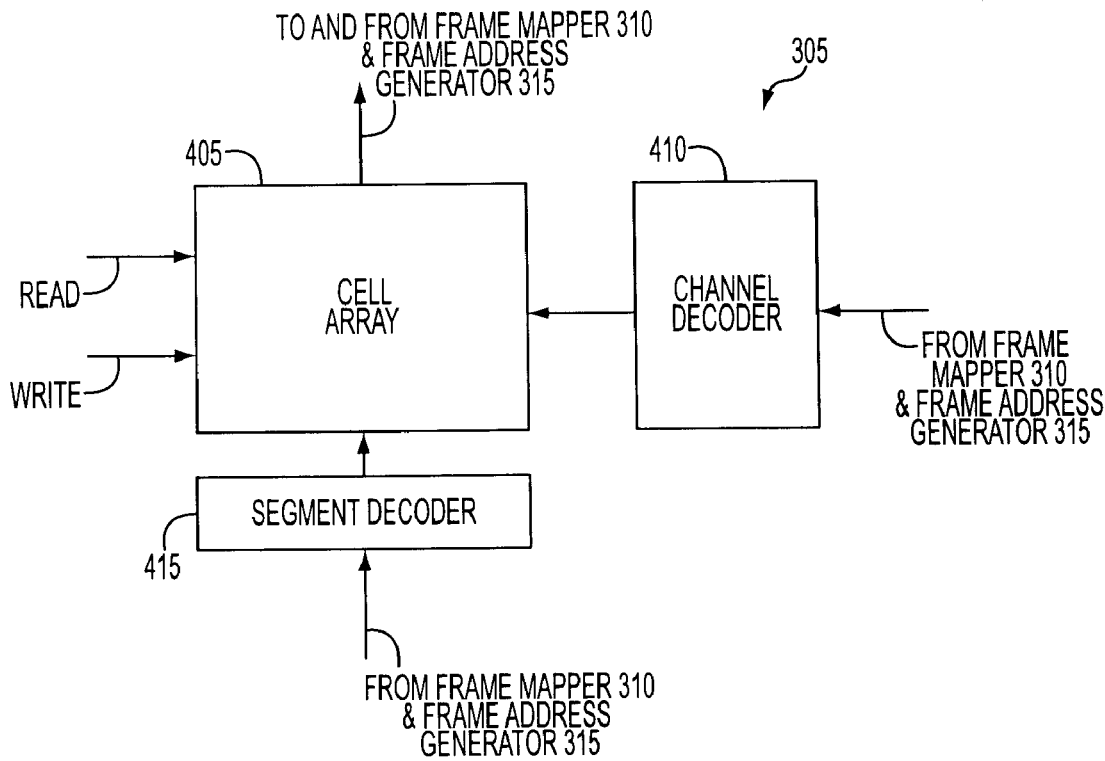
FIG. 4a is a block diagram of memory circuit of the controller of FIG. 3.

As shown in FIG. 4a, an exemplary memory 305 may include an array of memory cells 405, a channel decoder 410 and a segment decoder 415. In one implementation, array 405 is four bits wide and sixteen bits long. This correlates to main memory 125, which has four channels and sixteen segments.

Each cell in array 405 holds a single bit and correlates to a particular channel in a particular segment of main memory 125. If a particular cell in memory 305 currently stores a 1-bit, that is an indication that the corresponding channel of the corresponding segment of main memory 125 contains valid frame data and cannot presently accept a new data frame. Alternatively, if a particular location in memory 305 currently stores a 0-bit, that is an indication that the corresponding channel of the corresponding segment of main memory 125 contains invalid frame data, (i.e., it is empty) and can presently accept new data.

Each cell in array 405 is individually addressable through channel decoder 410 and segment decoder 415, which receive control signals from the frame mapper circuit 310 and frame address generator circuit 315. In either implementation, the cells also may be addressable by row or column.

Figure 4B:
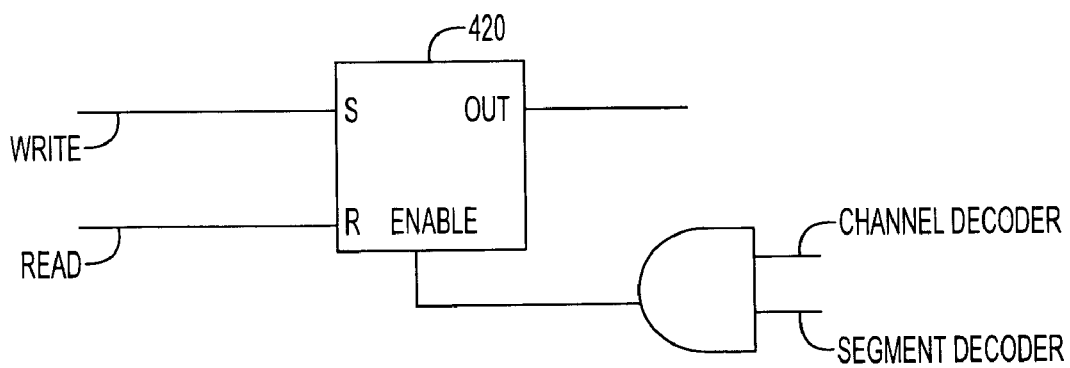

As shown in FIG. 4b, each cell 420 of array 405 may be implemented as an S-R flip flop that is enabled by a combination of the appropriate channel decoder and segment decoder signals. The set input of the flip-flop is connected to a write signal, and the reset input is connected to a read signal. Thus, the value of the cell is set to one when the write signal is asserted and the channel decoder and segment decoder signals indicate that data are being loaded into the corresponding portion of memory 125, and is set to zero when the read signal is asserted and the decoder signals indicate that data are being read from the corresponding portion of main memory 125. The cell 420 may be further configured to produce an output only when the enable signal is asserted so as to permit the controller to poll the memory 305 to detect cells having values indicative of available portions of main memory 125.

An exemplary main memory 125 may have four channels, each of which is 64 bytes wide, and sixteen segments. This means that main memory 125 can store 64, 64-byte data frames (one in each channel in each segment), sixteen, 256-byte data frames (one spanning all four channels in each segment), or other combinations.

Figure 5:
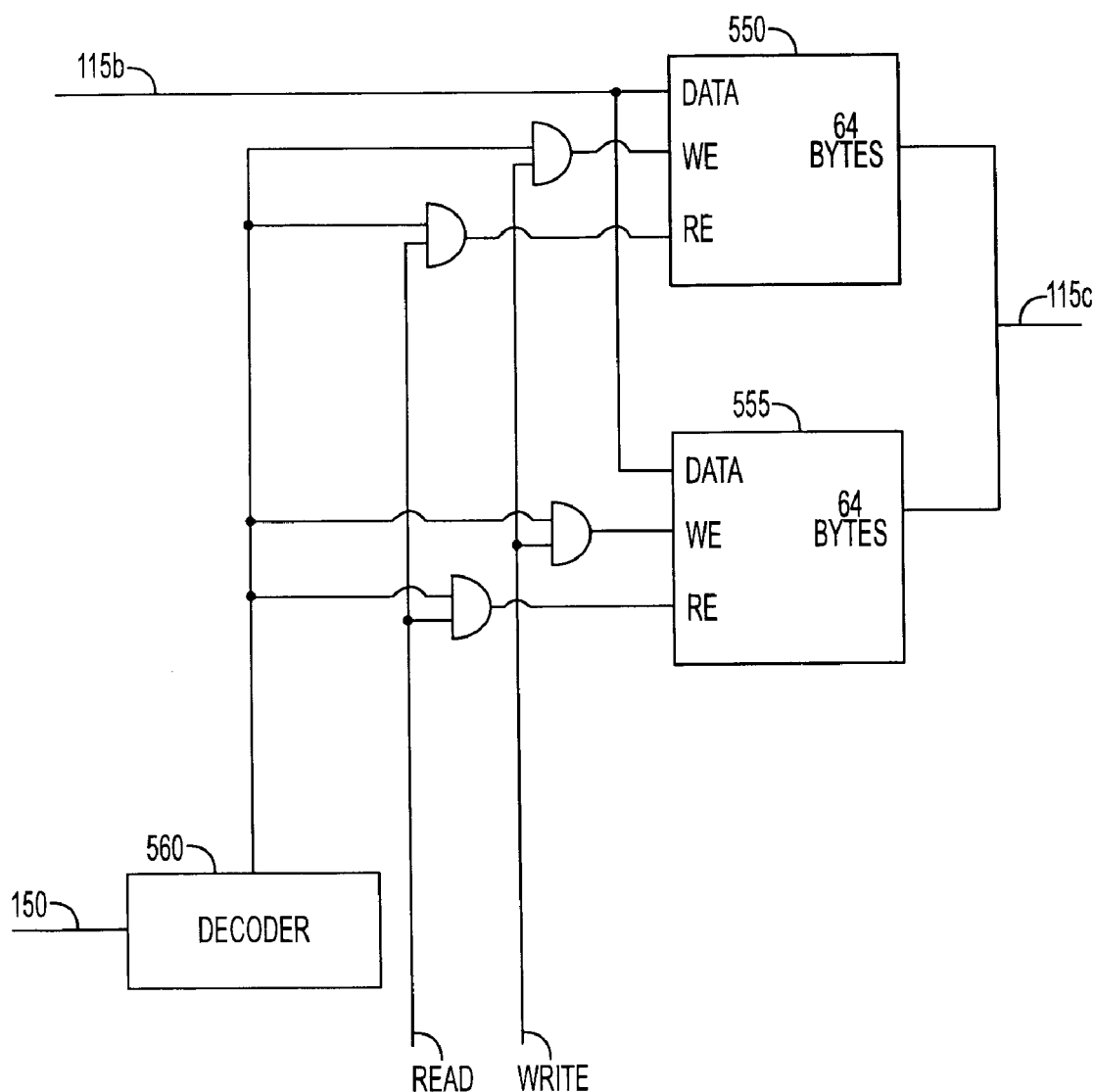
FIG. 5 is a block diagram of a main memory circuit of the switch of FIG. 1.

FIG. 5 shows a pair of exemplary cells 550, 555 in main memory 125 that each store 64 bytes. Each cell represents one location in main memory 125 (i.e., one channel of one segment). A decoder 560 uses the address bus 150 to generate signals that are combined with read and write signals to enable writing to and reading of a particular one of the cells 550, 555. It should also be noted that any type of randomly accessible, writeable storage device may be used. Examples include RAM, SRAM, DRAM, RDRAM and SDRAM.

When a data frame is received, a determination is made as to which portion of main memory 125 is to store the received data frame. The received data frame then is forwarded onto bus 115b and the address bus 150 is used to identify one or more appropriate cells. The appropriate cells are activated by a combination of a signal from the decoder 560 and a write enable signal from the control circuit 120. Similarly, a stored data frame is forwarded onto bus 115c by signals on the address bus 150 identifying the appropriate cells. The cells are activated by a combination of a signal from the decoder 560 and a read enable signal from the control circuit 120.

Figure 6:
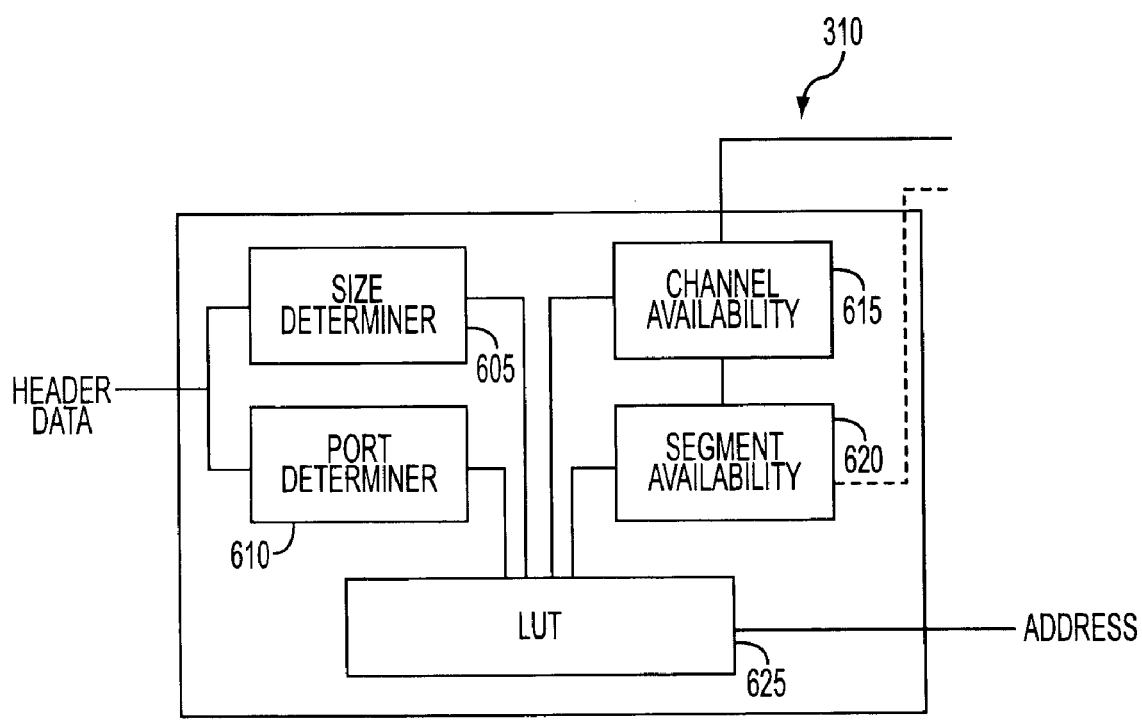
FIG. 6 is a block diagram of a frame mapper circuit of the controller shown in FIG. 3.

As shown in FIG. 6, an exemplary frame mapper circuit 310 includes size determiner circuit 605 and port determiner circuit 610. Frame mapper circuit 310 also includes channel availability circuit 615 and segment availability circuit 620.

Size determiner circuit 605 receives some of the header data from received data frames. More particularly, size determiner circuit 605 receives data that inform switch 100 of the size of the received data frame. These data are used to map wide data frames, typically wider than a single channel, to multiple channels in a single segment in main memory 125. It should be noted that in other implementations, wide data frames may be written into multiple channels in multiple segments.

Port determiner circuit 610 performs two functions. The first function is to determine which port 105*a*–105*d* received the data frame. An exemplary way to perform this function is to have each port output a unique signal onto receiving bus 115*a* that port determiner circuit 610 decodes to determine which port 105*a*–105*d* forwarded the data frame to it. One way of decoding the unique signal is to take the assigned port number and perform a modulo operation (e.g., if the switch has four ports, the decoder performs a modulo 4 operation).

The second function of port determiner circuit 610 is to determine which output port is to transmit the received data frame. One way to accomplish this function is to have port determiner circuit 610 receive a portion of the header data and read the destination address therein. Port determiner circuit 610 then correlates this header data with the appropriate port 105*a*–105*d*.

Channel availability circuit 615 receives data from memory 305 and determines which channel locations in main memory 125 are free of valid data frame data. It forwards these results to segment availability circuit 620 which then determines which segment locations in main memory 125 are free of valid frame data. In other implementations, both of these two circuits receive data directly from memory 305 (this variation is represented by the dashed line in FIG. 6). These circuits operate by simply polling memory 305 to determine where zeroes, indicative of empty locations in main memory 125, are located.

Size determiner circuit 605, port determiner circuit 610, channel availability circuit 615 and segment availability circuit 620 all output data to look-up table 625. Look-up table 625 uses these data inputs to generate address signals for enabling the corresponding locations in main memory 125 to store the received data frame and associated map codes that are forwarded to the transmission queues 130*a*–130*d* that are used to retrieve the stored data frame as is described later.

Since the look-up table 625 generates the same address when it receives a particular set of inputs, the look-up table 625 orders the received data frames to be stored systematically (i.e., not randomly). In other words, this systematic storing of data frames is a result of an established one-to-one association or relationship between the data received by the look-up table 625 and the addresses it generates.

In some implementations, look-up table 625 may only output addresses for contiguous channels. For example, if the received data frame is 128 bytes wide (two channels), look-up table 625 will only output contiguous addresses to adjacent channels. In alternative implementations, look-up table 625 may be programmed to output non-contiguous addresses. This feature allows for more efficient packing of the data frames in main memory 125.

Figure 7:
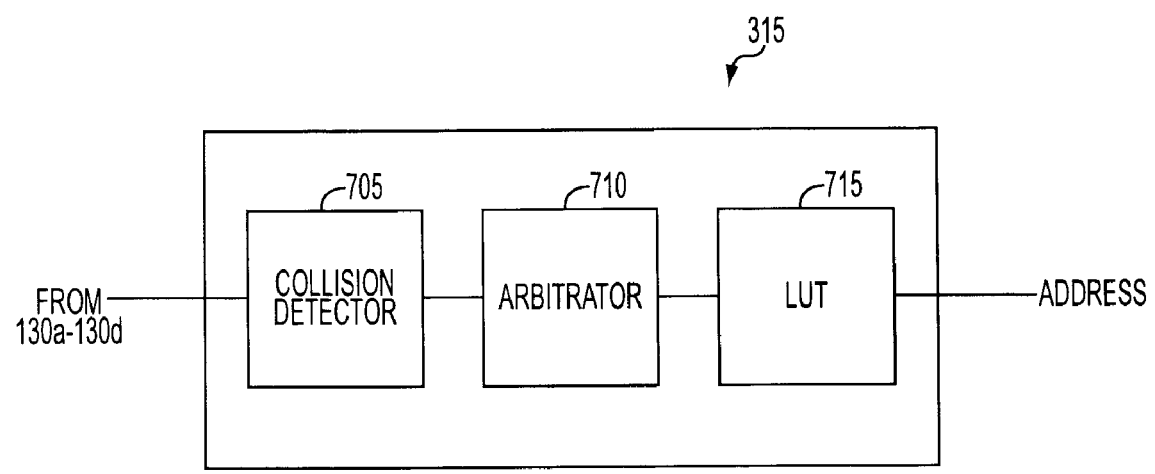
FIG. 7 is a block diagram of a frame address generator of the controller shown in FIG. 3.

As shown in FIG. 7, frame address generator 315 includes collision detector circuit 705. Collision detector circuit 705 receives data from the four transmission queues 130*a*–130*d*. Collision detector circuit 705 outputs data to arbitrator circuit 710. Arbitrator circuit 710 outputs data to look-up table 715.

In general, exemplary collision detector circuit 705 looks for possible collisions when outputting data from main memory 125. An example of a collision is attempting to output data from two different data frames from memory 125 onto the same portion of transmitting bus 115*c*. Another example of a collision is outputting too much data (e.g., the enabling of a pair of segments and a pair of channels, which would allow the output of four, 64-byte quantities, where the ports are only ready to transmit three, 64-byte quantities). This second collision causes one location to be emptied before the ports 105*a*–105*d* can output the data frame such that data stored in that particular location are lost.

Collision detection is accomplished by comparing the map codes received from the transmission queues 130*a*–130*d*. Collision detector 705 operates using a set of rules that may be programmed into software, hardware or firmware. An exemplary rule is the comparison of the received map codes to determine if two or more of the received map codes will cause data to be output onto the same portion of transmitting bus 115*c*. If main memory 125 is configured to output one set of channel data onto a particular portion of transmitting bus 115*c*, it follows that if two segments output data from the same channel simultaneously a data collision will occur. Thus, a simple comparison to determine if the transmission queues 130*a*–130*d* are requesting data from the same channel address on two different segment addresses is performed.

Collision detector 705 generates output data based upon the one or more comparisons it performs. The output data indicate which, if any, of the received map codes are colliding. Arbitrator 710 uses this output data to select one or more map code combinations that instruct main memory 125 to output data frame data without causing collisions. In an alternative implementation, arbitrator 710 selects one or more colliding map codes for temporary removal and forwards the non-colliding map codes to look-up table 715.

Figure 8:
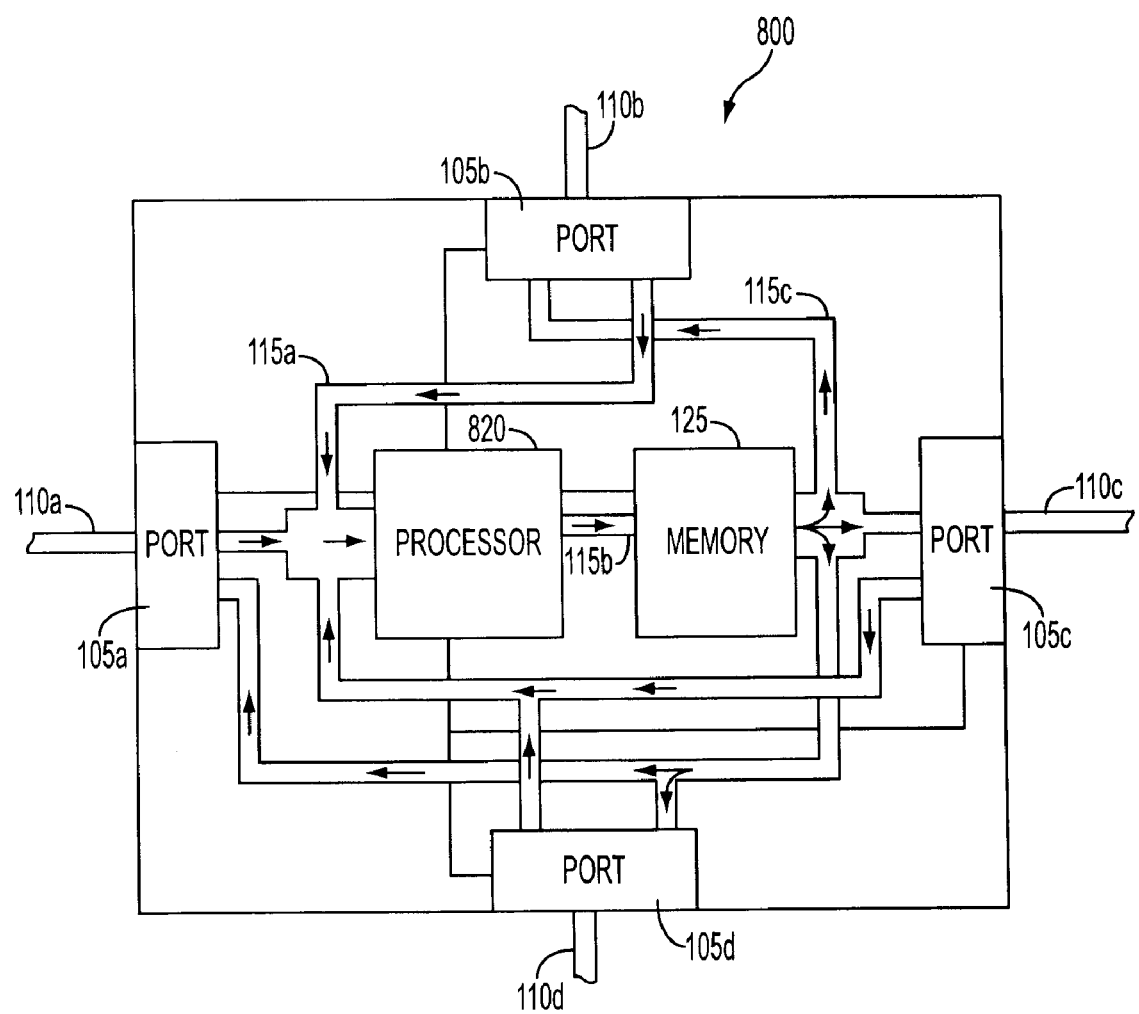
FIG. 8 is a block diagram of another switch.

Look-up table 715 receives the non-colliding map codes from arbitrator 710 and translates those map codes into addresses. The addresses generated by look-up table 715 are used by main memory 125 to output data frames and by memory 305 to indicate newly vacated locations in main memory 125. FIG. 8 shows an alternative switch 800 that includes a general processor 820. Like exemplary switch 100, switch 800 includes four ports 105*a*–105*d* that are coupled with four external buses 110*a*–110*d* and internal buses 115*a*–115*c*. Processor 820 is coupled with internal bus 115*a* and intermediate bus 115*b*. Memory 125 is coupled with intermediate buses 115*b* and internal bus 115*c*.

The function and operation of most of the elements of exemplary switch 800 have been previously described and will not be repeated. One difference between exemplary switches 100 and 800 is the use of a general purpose processor to perform the determining of acceptable memory locations to store the received data frames and the outputting of data frames from memory 125 to ports 105*a*–105*d* for transmission over buses 110*a*–110*d*. Processor 820 contains memory such as ROM or RAM (not shown) that holds the instructions used to control the operation of processor 820 and therefore the operation of switch 800.

Figure 9:
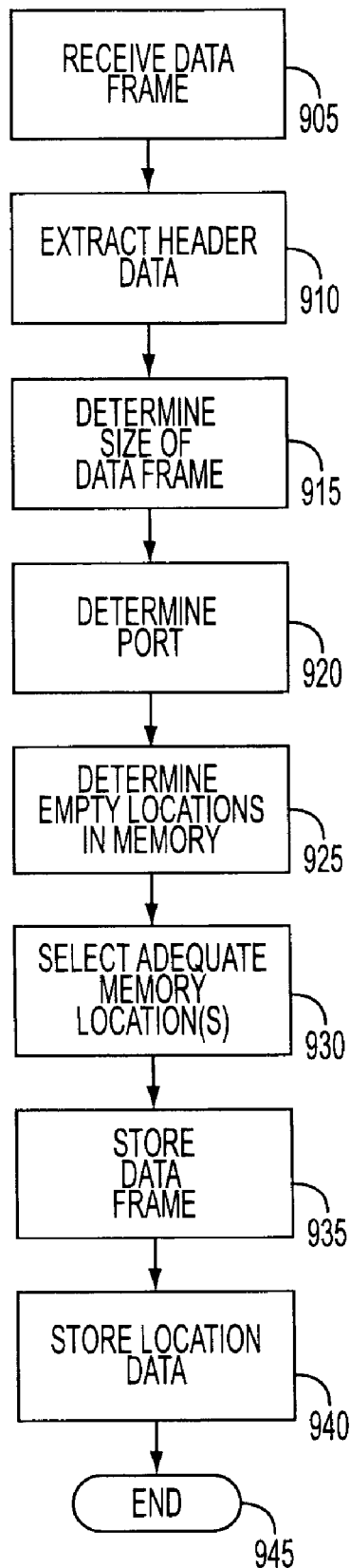
FIG. 9 is a flow chart of a process for storing a received data frame using the switch of FIG. 1.

FIG. 9 shows an exemplary process for storing a received data frame. This process is initiated when the switch receives a data frame (step 905). The header information, which contains at least destination information and frame size, is extracted from the data frame (step 910). Using the header data, the size of the received data frame is determined (step 915). In addition, the identity of the port that received the data frame is determined (step 920).

Next, the empty locations in main memory are determined (step 925). One exemplary method of performing this step is to store 1-bits and 0-bits in a separate memory that correspond to full and empty locations, respectively, in the data frame memory and to poll this separate memory to locate an adequate concentration of 0-bits that correlate to the size in the data frame memory that can store the copies of the received data frame. Once all of the suitable locations in frame memory have been identified, one or more locations are selected to store the copies of the data frame (step 930). The data frame is then stored in the selected memory locations of the frame memory (step 935). Each data frame is associated with a port that will transmit it and this association, along with the locations in frame memory of the data frame, is stored in a memory (step 940). The process then ends (step 945).

Figure 10:
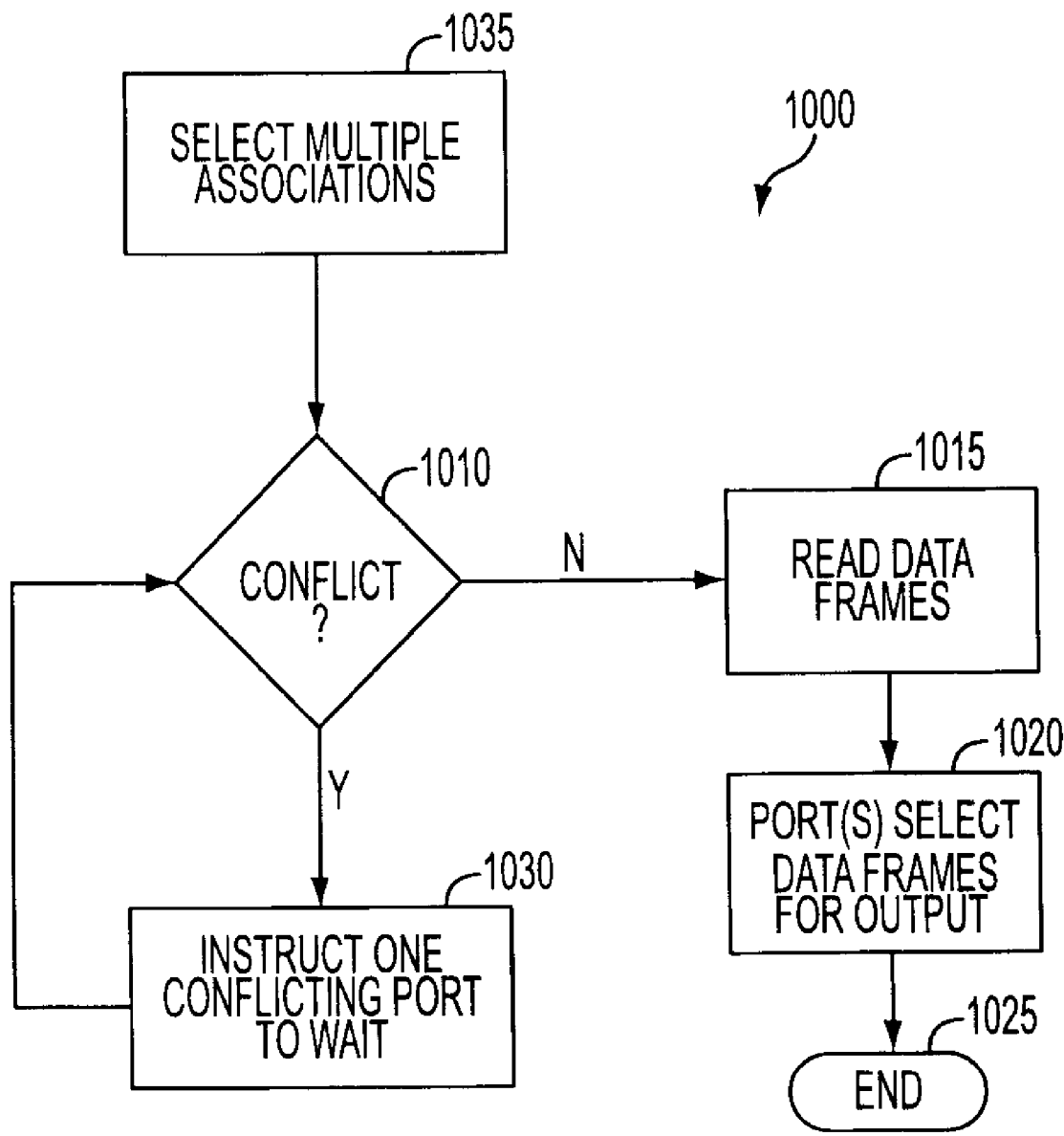
FIG. 10 is a flow chart of a process for reading a data frame from the switch of FIG. 1.

FIG. 10 shows an exemplary process 1000 for outputting data frames from a switch. The process begins when multiple associations are selected (step 1005). In other words, each port of the switch is polled to determine if it has a data frame in frame memory that is ready to be transmitted. One exemplary way of performing this step is to store the associations in a queue and read them in a first-in-first-out (FIFO) order.

With multiple ports requesting data from the frame memory at the same time, a conflict may arise such that two ports will require data from locations that share a data output bus in the frame memory. Accordingly, a determination is made to see if there is a conflict (step 1010). If there is no conflict such that every port that has data frames to output may do so simultaneously, then the data frames are read from the frame memory in parallel (step 1015). The ports select the data frames that are to be output, based on the association described above, and output the selected data frames (step 1020). The process then ends (step 1025).

If a conflict is determined (see step 1010), then one of the ports that has a conflict is instructed to wait (step 1030) and the remaining associations are checked again for a conflict (step 1010). At worst case, ports will be instructed to wait until only one port remains and then the remaining port will be able to retrieve and output its data frames freely (see steps 1015–1025).

Figure 11A:
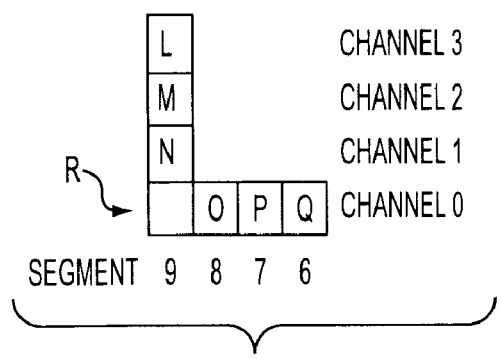
FIGS. 11a–11d are representations of data frames stored in memory.

FIGS. 11a–11d show portions of a main memory. FIG. 11a shows exemplary segment 9 and a portion of channel 0. Of the seven shown locations, six are currently holding data. When new data frame R is received, it is possible that the random address generation circuit (not shown) will randomly pick the six full locations before selecting the empty location. Thus, in a worst-case scenario, the performance of the switch that randomly selects occupied locations will wait six cycles before properly placing the newly received data frame R in the empty location addressed by segment 9, channel 0.

In contrast, a switch implementing the systems and methods described above will properly place the newly received data frame R in the vacant location at the first cycle.

Figure 11B:
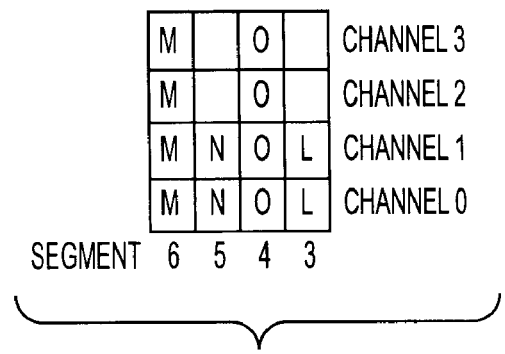

FIG. 11b shows a portion of a memory where the data frames are stored contiguously and random location selection was performed. Since data frame M could not be divided, it was stored in segment 6 across all four channels. Thus, at least four segments are needed to store the four received data frames. In addition, due to random location selection, the memory is not utilized to its maximum bandwidth potential. That is, data frame N is not stored in segment 3, channels 2 and 3 but is instead stored in segment 5. Thus, to forward data frames L-O will require four clock cycles.

Figure 11C:
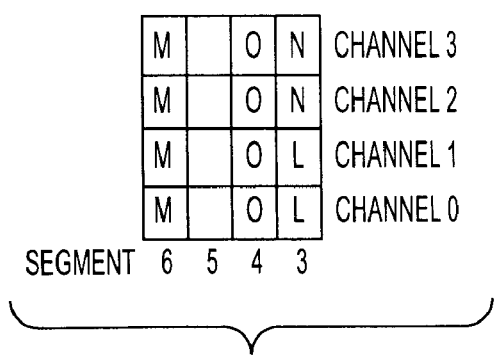

As shown in FIG. 11c, data frame N is stored in segment 3 along with data frame L. By using a systematic method of storing data frames into the memory, the useful bandwidth of the memory increases. Assuming there are not conflicts for output ports between data frames L and N, all of the data frames L-O can be forwarded in three clock cycles instead of four.

Figure 11D:
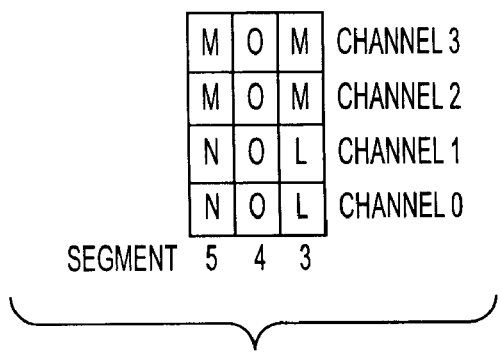

As shown in FIG. 11d, allowing data frames to be divided allows the four received data frames to be stored in three segments. Thus, implementations that allow data frames to be stored non-contiguously allows for increased useful bandwidth of a memory. That is, assuming there no conflicts for output ports between the various data frames, the four data frames L-O can be forwarded in three clock cycles instead of four.

A number of implementations have been described. Nevertheless, it will be understood that various modifications may be made. For example, in alternative implementations, the FIFO function of the transmission queue is modified to take into account priority of the received frames. Thus, a data frame that is added later to the queue but that has a high priority can be output before other data frames that were received earlier.

Accordingly, other implementations are within the scope of the following claims.

What is claimed is:

1. A switching apparatus comprising:
   an input port, an output port, and a bus that connects said input and output ports;
   a first memory, coupled to said bus, and configured to store an input data frame, wherein the first memory includes channels and segments, where each segment defines a logical time portion of a channel and each location in the first memory is designated by a channel and a segment;
   a first logic circuit coupled to receive an input data frame, coupled to the first memory and configured to determine if multiple items of data on said bus will be produced on the same segment, and if so, stopping said multiple items from being output, to prevent collisions, and to allow one or more locations in the first memory that can store the input data frame; and
   a second logic circuit coupled to the first memory and configured to determine when to read the input data frame from the first memory.

2. The switching apparatus of claim 1 wherein the first logic circuit further comprises a second memory for monitoring vacant locations in the first memory.

3. The switching apparatus of claim 1 further comprising a first port coupled to receive the input data frame and forward it to the first logic circuit wherein the first logic circuit uses an association between the first port and one of the channels to determine the one or more locations in the first memory that can store the input data frame.

4. The switching apparatus of claim 1 further comprising a first port coupled to receive the input data frame and forward it to the first logic circuit wherein the first logic circuit uses an association between the first port and one of the segments to determine the one or more locations in the first memory that can store the input data frame.

5. An apparatus for switching data, the apparatus comprising:
   at least one port coupled to receive and transmit a data frame;
   a first memory including locations and operating to store and forward the data frame, wherein the first memory includes channels and segments, where each segment defines a logical time portion of a channel and each location in the first memory is designated by a channel and a segment;

a data bus, connecting said at least one port to said first memory;

a frame mapper coupled to the first memory and the at least one port and configured to determine vacant locations in the first memory and to determine if multiple items of data on said bus will be produced on the same segment, and if so, stopping said multiple items from being output to prevent collisions by generating map code combinations that reduce data collisions associated with a first location in the first memory that stores the data frame;

a queue coupled to the frame mapper and configured to store the map code combinations; and a frame address generator coupled to the queue and configured to receive the map code combinations from the queue to read out the received data frame from the first memory.

6. The apparatus of claim 5 wherein the frame mapper further comprises:

a second memory that stores data identifying vacant locations in the first memory; and logic circuits that use the data stored in the second memory to generate the map code combinations and a write address for the first memory.

7. The apparatus of claim 5 wherein the frame address generator further comprises logic circuits that use the map code received from the queue to generate a read address for the first memory.

8. The apparatus of claim 5 wherein the frame mapper systematically generates the map code combinations so as to include contiguous locations in the first memory.

9. The apparatus of claim 5 wherein the frame mapper systematically generates the map code combinations so as to include non-contiguous locations in the first memory.

10. The switching apparatus of claim 5 wherein the frame mapper uses an association between the at least one port and a channel within the memory in generating the map code.

11. The switching apparatus of claim 5 wherein the frame mapper uses an association between the at least one port and a segment within the memory in generating the map code.

12. A computer-readable storage medium having stored thereon one or more sequences of instructions for causing a processing system to perform operations comprising:

receiving a data frame;

systematically determining plural locations in a memory, with each location being defined by one channel and one segment address, to store the received data frame, wherein the first memory includes channels and segments, where each segment defines a logical time portion of a channel and each location in the first memory is designated by a channel and a segment;

storing the first data frame in the determined one or more locations;

generating a map code associated with the determined plural locations;

forwarding the map code to a decoder to generate channel and segment addresses of the plural locations;

using the channel and segment addresses to read the data frame from the memory by determining if multiple items of data on said bus will be produced on the same segment, and if so, stopping said multiple items from being output, to prevent collisions; and outputting the read data frame through a first port.

13. The computer readable storage medium of claim 12 wherein systematically determining one or more locations in the memory further comprises determining a channel address of one or more locations in association with a port reference number that designates which of a set of ports received the data frame.

14. The computer readable storage medium of claim 12 wherein the operations further comprise determining the size of the data frame.

15. The computer readable storage medium of claim 12 wherein the data frame is stored across channels in the memory.

16. The computer readable storage medium of claim 15 wherein the channels are contiguous.

17. The computer readable storage medium of claim 15 wherein the channels are non-contiguous.

18. The computer readable storage medium of claim 12 wherein the data frame is stored across segments in the memory.

19. The computer readable storage medium of claim 18 wherein the segments are contiguous.

20. The computer readable storage medium of claim 18 wherein the segments are non-contiguous.

21. The computer readable storage medium of claim 12 wherein systematically determining one or more locations in the memory comprises use of an association between a second port and a channel.

22. The computer readable storage medium of claim 12 wherein systematically determining one or more locations in the memory comprises use of an association between a second port and a segment.

* * * * *